United States Patent
Grunder et al.

(10) Patent No.: US 9,321,880 B2
(45) Date of Patent: Apr. 26, 2016

(54) EPOXY RESIN SYSTEM CONTAINING POLYETHYLENE TETRAMINES AND TRIETHYLENE DIAMINE CATALYST FOR RESIN TRANSFER MOLDING PROCESSES

(71) Applicant: Dow Global Technologies LLC, Midland, MI (US)

(72) Inventors: Sergio Grunder, Zurich (CH); Rainer Koeniger, St. Gallenkappel (CH); Timothy A. Morley, Horgen (CH); Nebjosa Jelic, Wangen (CH); Sylvie Vervoort, Ghent (BE); Martin Reimers, BW Buehl-Rittersbach (DE); Peter Cate, Blockley (GB)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 14/422,047

(22) PCT Filed: Nov. 11, 2013

(86) PCT No.: PCT/US2013/069377
§ 371 (c)(1),
(2) Date: Feb. 17, 2015

(87) PCT Pub. No.: WO2014/078218
PCT Pub. Date: May 22, 2014

(65) Prior Publication Data
US 2015/0203628 A1 Jul. 23, 2015

Related U.S. Application Data

(60) Provisional application No. 61/725,724, filed on Nov. 13, 2012.

(51) Int. Cl.
*C08G 59/56* (2006.01)
*C08G 59/50* (2006.01)
*C08G 59/68* (2006.01)
*C08G 59/24* (2006.01)
*C08J 5/04* (2006.01)

(52) U.S. Cl.
CPC .......... *C08G 59/502* (2013.01); *C08G 59/245* (2013.01); *C08G 59/5073* (2013.01); *C08G 59/56* (2013.01); *C08G 59/686* (2013.01); *C08J 5/042* (2013.01); *C08J 2363/02* (2013.01)

(58) Field of Classification Search
None
See application file for complete search history.

(56) References Cited

U.S. PATENT DOCUMENTS

| | | |
|---|---|---|
| 3,306,872 A | 2/1967 | Maycock et al. |
| 3,341,580 A | 9/1967 | Hechenbleikner |
| 3,379,684 A | 4/1968 | Wiesner et al. |
| 3,477,990 A | 11/1969 | Dante et al. |
| 3,547,881 A | 12/1970 | Mueller et al. |
| 3,637,590 A | 1/1972 | Maycock et al. |
| 3,843,605 A | 10/1974 | Schmidt et al. |
| 3,948,855 A | 4/1976 | Perry |
| 3,956,237 A | 5/1976 | Doorakian et al. |
| 4,048,141 A | 9/1977 | Doorakian et al. |
| 4,093,650 A | 6/1978 | Doorakian et al. |
| 4,131,633 A | 12/1978 | Doorakian et al. |
| 4,132,706 A | 1/1979 | Doorakian et al. |
| 4,171,420 A | 10/1979 | Doorakian et al. |
| 4,177,216 A | 12/1979 | Doorakian et al. |
| 4,302,574 A | 11/1981 | Doorakian et al. |
| 4,320,222 A | 3/1982 | Lopez |
| 4,358,578 A | 11/1982 | Brownscombe |
| 4,366,295 A | 12/1982 | Tyler, Jr. et al. |
| 4,389,520 A | 6/1983 | Gannon |
| 4,546,166 A * | 10/1985 | Niinomi .................. C08G 18/10 528/60 |
| 4,992,228 A | 2/1991 | Heck et al. |
| 5,080,851 A | 1/1992 | Flonc et al. |
| 5,112,932 A | 5/1992 | Koenig et al. |
| 5,294,649 A * | 3/1994 | Gerber .................. C04B 26/122 523/139 |
| 5,414,067 A | 5/1995 | Vratsanos et al. |
| 5,698,318 A | 12/1997 | Burton et al. |
| 6,329,473 B1 * | 12/2001 | Marten .................. C08G 59/10 525/438 |
| 2003/0024723 A1 * | 2/2003 | Igarashi ................ C08G 59/08 174/521 |
| 2004/0249026 A1 * | 12/2004 | Tsuji ........................ C08F 8/00 524/81 |
| 2007/0244268 A1 * | 10/2007 | Usui ...................... C08G 59/18 525/524 |
| 2010/0029991 A1 * | 2/2010 | Dahmen ............... C07C 209/48 564/490 |
| 2011/0218270 A1 * | 9/2011 | Suter ...................... C08G 69/34 523/400 |
| 2012/0270967 A1 * | 10/2012 | Burckhardt ........ C08G 59/4042 523/400 |
| 2013/0261270 A1 * | 10/2013 | Butikofer .............. C07C 211/09 525/423 |
| 2014/0213698 A1 * | 7/2014 | Shields .................. C08G 59/56 523/468 |

FOREIGN PATENT DOCUMENTS

| | | |
|---|---|---|
| GB | 1158938 A | 7/1969 |
| WO | WO 2008/052973 A3 | 5/2008 |
| WO | WO 2008/140906 A1 | 11/2008 |
| WO | WO 2008/153542 A1 | 12/2008 |
| WO | WO 2011/107512 A1 | 9/2011 |
| WO | WO 2012/177392 A1 | 12/2012 |

* cited by examiner

*Primary Examiner* — Robert S Loewe
(74) *Attorney, Agent, or Firm* — Hong J. Xu

(57) ABSTRACT

A two-component curable epoxy resin system is disclosed. The resin system includes an epoxy resin component containing at least 80% by weight of a polyglycidyl ether of a polyphenol. The system also includes an hardener mixture containing mainly polyethylene tetraamines. The system include triethylene diamine in specific amounts as a catalyst. The system has beneficial curing characteristics that make it useful for producing fiber-reinforced composites in a resin transfer molding process.

18 Claims, No Drawings

EPOXY RESIN SYSTEM CONTAINING POLYETHYLENE TETRAMINES AND TRIETHYLENE DIAMINE CATALYST FOR RESIN TRANSFER MOLDING PROCESSES

This invention relates to thermosetting compositions and processes for preparing fiber-reinforced composites.

For many reasons, it is in some cases potentially advantageous to replace metal structural parts with reinforced organic polymers. Among the advantages the reinforced organic polymers offer include better resistance to corrosion, the ability to produce parts having complex geometries, and in some cases a superior strength-to-weight ratio. It is this last attribute that has led, and continues to lead, the adoption of reinforced polymers in the automotive industry as replacement for metal structural elements such as chassis members and other structural supports.

Epoxy resin systems are sometimes used as the polymer phase in such composites. Cured epoxy resins are often quite strong and stiff, and adhere well to the reinforcement. An advantage of epoxy resin systems, compared to most thermoplastic systems, is that low molecular weight, low viscosity precursors are used as starting materials. The low viscosity is an important attribute because it allows the resin system to penetrate easily between and wet out the fibers that usually form the reinforcement. This is necessary to avoid cosmetic blemishes such as flow lines and to produce a high strength composite.

Despite the potential advantages of these polymer composites, they have achieved only a small penetration into the automotive market. The main reason for this is cost. Metal parts can be produced using very inexpensive stamping processes that have the further advantage of producing parts at high operating rates. Polymer composites, on the other hand, must be produced in some sort of mold in which the polymer and reinforcing fibers are held until the polymer cures. The time required for this curing step directly affects production rates and equipment utilization, and therefore costs. Epoxy systems used for making these composites have required long in-mold residence times, and so the production cost has for the most part not been competitive with metal parts. Because of this, the use of epoxy resin composites to replace stamped metal parts has been largely limited to low production run vehicles. It is believed that in-mold curing times need to be reduced into the range of approximately 3 to 5 minutes for epoxy composites to become competitive with stamped metal parts for high production volume vehicles.

The manufacturing method of choice for making these fiber-reinforced composites is a resin-transfer process, or one of its variants such as vacuum-assisted resin transfer molding (VARTM), the Seeman Composites Resin Infusion Molding Process (SCRIMP), gap resin transfer molding (also known as compression RTM) and wet compression molding. In these processes, the reinforcing fibers are formed into a preform which is placed impregnated with a mixture of an epoxy resin component and a hardener which flows around and between the fibers, and is cured in a mold to form the composite.

The mold-filling step of these processes often takes 15 to 60 seconds or even more, depending on the size of the part and the particular equipment being used. During the entire mold-filling process, the resin system must maintain a viscosity low enough to allow it to flow between the reinforcing fibers and completely fill the mold. Resin systems formulated to cure rapidly also tend to build viscosity quite rapidly. If the fibers are pre-heated, which is often the case, the resin system can react very rapidly at points of contact with the heated fibers. The viscosity increase that accompanies this premature curing makes it difficult for the epoxy resin system to penetrate between fibers and wet them out. This results in moldings having problems that range from the cosmetic (visible flow lines, for example) to structural (the presence of voids and/or poor adhesion of the cured resin to the reinforcing fibers, each of which leads to a loss in physical properties).

The problem of too-rapid viscosity build usually cannot be overcome by increasing operating pressures (i.e., the force used to introduce the resin system into the mold) because doing so can move the reinforcing fibers around within the mold, leading to spots that have little or no reinforcement and other regions in which the fibers are packed more densely. This causes inconsistent properties throughout the part, and a general weakening of the composite as a whole. Therefore, an epoxy resin system useful in resin transfer molding (and related) processes should not only have a low initial viscosity and cure rapidly, but should also build viscosity slowly during the initial stages of cure.

Another important consideration is the glass transition temperature of the cured resin. For curing epoxy resin systems, the glass transition temperature increases as the polymerization reactions proceed. It is generally desirable for the resin to develop a glass transition temperature in excess of the mold temperature so the part can be demolded without damage. In some cases, the polymer must in addition achieve a glass transition temperature high enough for the part to perform properly in its intended use. Therefore, in addition to the curing attributes already described, the epoxy system must be one which can attain the necessary glass transition temperature upon full cure.

A glass transition temperature greater than 100° C. is generally regarded as a minimum requirement for many structural composites; a preferred glass transition temperature is 110° C. and a more preferred glass transition temperature is 120° C. or more. This glass transition temperature ideally develops while the part is on the mold, rather than in some post-curing process, so that the composite is strong and rigid upon demolding and so can be demolded without being damaged, and additional costs of performing a post-curing step can be avoided.

WO2008/153542 describes an epoxy resin system for resin transfer molding applications, in which the hardener is a gem-di(cyclohexylamine) substituted alkane. The system is catalyzed with a tertiary amine and/or a delayed action catalyst. This system is adapted to produce very large (10 kg or greater) parts that have very long shot times and long cures.

WO2008/052973 describes another approach to solving this problem. In the process described in WO 2008/052973, the epoxy resin and hardener are separately heated and then introduced into a hot mold that contains a fiber preform. The resin is then cured in the mold until it attains a glass transition temperature of at least 150° C. During the curing step, the mold temperature is at all times maintained above the glass transition temperature of the curing polymer. It is possible to obtain short demold times in this manner, but a significant drawback of this process is that the cured polymer is at a temperature higher than its glass transition temperature and therefore is soft, rubbery and difficult to demold without damaging the part. The high mold temperatures needed in this process also significantly increase energy requirements.

WO 2012/177392 describes a system that largely meets the requirements of long open time and fast cure contains a diglycidyl ether of bisphenol A, diethylene triamine as a hardener, and a mixture of bisphenol A and a Mannich base of bisphenol A and diethylene triamine that is believed to function as both a catalyst and crosslinker. This system requires rather low mold temperatures (90 to 100° C.) in order to achieve the needed open time; at higher temperatures, the open time can become too short to reproducibly produce good quality composites. An excess of the amine hardener is needed to obtain the needed balance of gel and cure times. The presence of the excess amine hardener in this system depresses the glass transition temperature to values that are only minimally adequate.

The glass transition temperature of foregoing system can be increased through the addition of a cycloaliphatic diamine crosslinker such as isophorone diamine. However the cycloaliphatic diamine reacts more slowly, and as a result it is necessary to increase mold temperatures very significantly in order to obtain short demold times. Even at a 120° C. mold temperature, demold times can be 50 to 100% longer when the cycloaliphatic diamine crosslinker is present. If higher mold temperatures are used, the open time becomes too short. Therefore, this system provides enhanced glass transition temperature at the expense of a much longer demold time and/or a much shorter open time, depending on the mold temperature that is selected. In any event, much higher mold temperatures are needed than is the case when the cycloaliphatic diamine is omitted.

Another very significant issue with the foregoing is the presence of diethylene triamine, which is coming under regulatory pressure in some jurisdictions. There is a strong desire to replace diethylene triamine with an alternative hardener, while retaining the benefits of low initial viscosity, good open time and fast cure. A higher glass transition temperature would be further advantage, if it could be obtained without comprising the needed curing characteristics.

What is desired is a method for producing good quality fiber-reinforced epoxy resin composites with short cycle times. The epoxy resin system should have a long open time and a low initial viscosity, and should then cure rapidly to produce a composite in which the resin phase has a glass transition temperature of at least 110° C. and preferably at least 120° C.

The invention is in one aspect a curable epoxy resin system, comprising
1) an epoxy resin component containing one or more epoxy resins, wherein at least 80% by weight of the epoxy resins is one or more polyglycidyl ethers of a polyphenol that has an epoxy equivalent weight of up to about 250;
2) an amine hardener, wherein the amine hardener is a polyethylene tetraamine mixture containing at least 95% by weight polyethylene tetraamines, the mixture containing at least 40% by weight linear triethylene tetraamine, wherein at least 0.8 epoxy equivalents are provided to the reaction mixture by the epoxy resin component per amine hydrogen equivalent provided by the amine hardener; and
3) 0.01 to 0.5 moles of triethylene diamine per mole of primary and/or secondary amine compounds in the amine hardener, the triethylene diamine being present in the epoxy resin component, the amine hardener, or both.

This invention is in another aspect a process for forming a fiber-reinforced epoxy composite, comprising;
a) mixing an epoxy resin component with an amine hardener by impingement mixing and transferring the resulting reactive mixture into a mold that contains reinforcing fibers, and
b) curing the reactive mixture in the mold at an elevated temperature to form a fiber-reinforced composite in which the reinforcing fibers are embedded in a polymeric matrix formed by curing the reactive mixture, and
c) demolding the fiber-reinforced composite, wherein;
1) the epoxy resin component contains one or more epoxy resins, wherein at least 80% by weight of the epoxy resin is one or more polyglycidyl ethers of a polyphenol that has an epoxy equivalent weight of up to about 250;
2) the amine hardener is a polyethylene tetraamine mixture containing at least 95% by weight polyethylene tetraamines, the mixture containing at least 40% by weight linear triethylene tetraamine,
3) in step a) the epoxy resin component and the amine hardener are mixed in proportions which, prior to reaction, provide 0.8 to 1.25 epoxy equivalents per equivalent of amine hydrogens; and
4) 0.01 to 0.5 moles of triethylene diamine are provided in the reactive mixture per mole of primary and/or secondary amine compounds provided in the amine hardener.

Applicants have found that the combination of epoxy resin, a polyethylene tetraamine mixture hardener and triethylene diamine provides a unique and unexpected combination of extended open time and fast cure, while at the same time producing a high (>110° C.) glass transition temperature cured polymer. Mold temperatures needed to accomplish this generally do not exceed 120° C.

In the invention, the epoxy resin component contains one or more epoxy resins, by which it is meant compounds having an average of two or more epoxide groups that are curable by reaction with a primary or secondary amine per molecule. At least 80% by weight of the epoxy resin component is one or more polyglycidyl ethers of a polyphenol that has an epoxy equivalent weight of up to about 250. Other epoxy resins as described below may constitute up to 20%, preferably from zero to 10% and more preferably from zero to 5% by weight of the epoxy resin component. The polyglycidyl ether of a polyphenol is most preferably the only epoxy resin in the epoxy resin component. The polyglycidyl ether of a polyphenol preferably has an epoxy equivalent weight of 160 to 220.

The polyglycidyl ether of the polyphenol may be a diglycidyl ether of a diphenol such as, for example, resorcinol, catechol, hydroquinone, bisphenol, bisphenol A, bisphenol AP (1,1-bis(4-hydroxylphenyl)-1-phenyl ethane), bisphenol F, bisphenol K, tetramethylbiphenol, or mixtures of two or more thereof. The polyglycidyl ether of the polyphenol may be advanced, provided that the epoxy equivalent weight is about 250 or less.

Suitable polyglycidyl ethers of polyhydric phenols include those represented by structure (I)

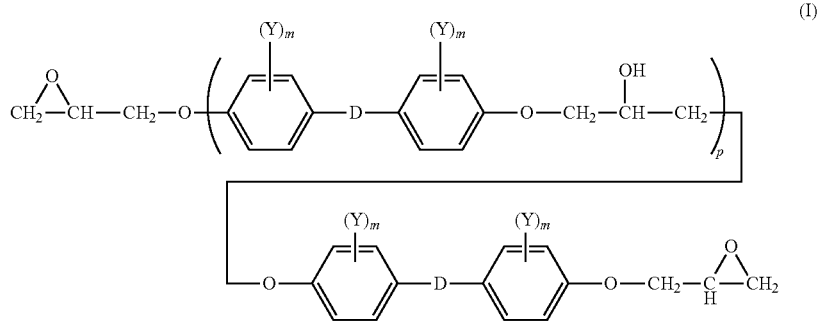

(I)

wherein each Y is independently a halogen atom, each D is a divalent hydrocarbon group suitably having from 1 to about 10, preferably from 1 to about 5, more preferably from 1 to about 3 carbon atoms, —S—, —S—S—, —SO—, —SO$_2$—, —CO$_3$—, —CO— or —O—, each m may be 0, 1, 2, 3 or 4 and p is a number from 0 to 5, especially from 0 to 2.

Among the other epoxy resins that may be present in the epoxy resin composition are, for example, polyglycidyl ethers of polyglycols; epoxy novolac resins including cresol-formaldehyde novolac epoxy resins, phenol-formaldehyde novolac epoxy resins and bisphenol A novolac epoxy resins; cycloaliphatic epoxides; tris(glycidyloxyphenyl)methane; tetrakis(glycidyloxyphenyl)ethane; tetraglycidyl diaminodiphenylmethane; oxazolidone-containing compounds as described in U.S. Pat. No. 5,112,932; and advanced epoxy-isocyanate copolymers such as those sold commercially as D.E.R.™ 592 and D.E.R.™ 6508 (The Dow Chemical Company).

Still other useful epoxy resins are described, for example, in WO 2008/140906.

The epoxy resin component may have a low monohydrolyzed resin content. The epoxy resin may contain, for example, no more than 3%, preferably no more than 2% and still more preferably no more than 1% by weight of monohydrolyzed resin species. Monohydrolyzed resin species are α-glycol compounds formed by the addition of a molecule of water to an epoxide group. The presence of significant quantities of monohydrolyzed species tends to increase the viscosity of the epoxy resin component, and in turn that of the epoxy resin/hardener mixture. In addition, it is believed that these species may contribute to a reduction in open time.

The epoxy resin component may contain optional ingredients. Among these are solvents or reactive diluents such as are described in WO 2008/140906, pigments, antioxidants, preservatives, impact modifiers, short (up to about 6 inches (15.24 cm) in length, preferably up to 2 inches (5.08 cm) in length, more preferably up to about ½ inch (1.27 cm) in length) reinforcing fibers, non-fibrous particulate fillers including micron- and nano-particles, wetting agents and the like. An electroconductive filler may be present in the epoxy resin component.

The amine hardener is a polyethylene tetraamine mixture. By "polyethylene tetraamime mixture", it is meant a mixture of polyethylene polyamine compounds, of which at least 95% by weight have exactly four amine nitrogen atoms. For purposes of this invention, those polyethylene polyamine compounds having exactly four amine nitrogen atoms are referred to as "polyethylene tetraamine" compounds.

The polyethylene tetraamine compound can be linear, branched and/or or cyclic. At least 40% of the weight of the polyethylene tetraamine mixture is linear triethylene tetraamine, i.e.:

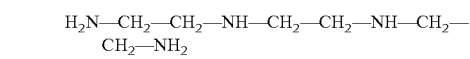

Linear triethylene tetraamine may constitute at least 60%, at least 90%, at least 95%, up to 100%, of the weight of the polyethylene tetraamine mixture.

The polyethylene tetraamine mixture may include other polyethylene tetraamine compounds such as, for example, N,N'-bis(2aminoethyl)piperazine, (piperazinoethyl)ethylenediamine and tris(aminoethyl)amine. These polyethylene tetaramine compounds are commonly present in significant amounts (up to, for example 55% or up to 35% by weight in the aggregate) in commercially available TETA (triethylene tetraamine) products.

The polyethylene tetraamine mixture may include small amounts of other aliphatic or cycloaliphatic amine compounds having three or fewer amine nitrogen atoms or five or more amine nitrogen atoms. These compounds preferably constitute at most 5% by weight, preferably at most 2% by weight and more preferably at most 1% by weight of the polyethylene tetraamine mixture. The polyethylene tetraamine mixture preferably contains no more than 0.3% by weight of aminoethylethanol amine.

The polyethylene tetraamine mixture preferably is the only hardener in the curable epoxy resin system. If other hardeners are present, the preferably constitute no more than 20%, more preferably no more than 10% and still more preferably no more than 5% by weight of the hardeners. Among the other hardeners that can be used are, for example, dicyandiamide, phenylene diamine (particularly the meta-isomer), bis(4-amino-3,5-dimethylphenyl)-1,4-diisopropylbenzene,bis(4-amino-phenyl)1,4-diiosopropylbenzene, diethyl toluene diamine, methylene dianiline, mixtures of methylene dianiline and polymethylene polyaniline compounds (sometimes referred to as PMDA, including commercially available products such as DL-50 from Air Products and Chemicals), diaminodiphenylsulfone, phenolic hardeners including those represented by the structure (III)

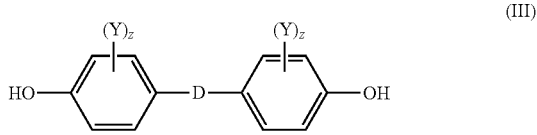

(III)

where each Y independently represents a halogen atom, each z is independently a number from 0 to 4 and D is a divalent hydrocarbon group as described with regard to structure I above. Examples of suitable phenolic hardeners include dihydric phenols such as bisphenol A, bisphenol K, bisphenol F, bisphenol S and bisphenol AD, and mixtures thereof, and their mono-, di-, tri- and tetra-brominated counterparts and amino-functional polyamides. These are available commercially under as Versamide® 100, 115, 125 and 140, from Henkel, and Ancamide® 100, 220, 260A and 350A, from Air Products and Chemicals.

The hardener and epoxy resins are combined in amounts such that at least 0.8 epoxy equivalents are provided to the reaction mixture per amine hydrogen equivalent provided by the epoxy resin component. A preferred amount is at least 0.90 epoxy equivalents per amine hydrogen equivalent and a still more preferred amount is at least 1.0 epoxy equivalents per amine hydrogen equivalent. The epoxy resin can be provided in large excess, such as up to 10 epoxy equivalents per amine hydrogen equivalent provided to the reaction mixture, but preferably there are no more than 2, more preferably no more than 1.25 and still more preferably no more than 1.10 epoxy equivalents provided per amine hydrogen equivalent. Embodiments in which the amine hardener is present in a small excess (such as, for example from 0.0 to 0.95 epoxy equivalents per equivalent of amine hydrogens) often exhibit particularly short demold times while producing a cured resin having a high glass transition temperature.

Triethylene diamine is provided to the reaction mixture, and performs a catalytic role. A suitable amount is about 0.01 to 0.5 moles of triethylene diamine per part per mole of per mole of primary and/or secondary amine compounds in the amine hardener. A preferred lower amount is 0.025 moles and a more preferred lower amount is 0.05 moles of triethylene diamine per mole of per mole of primary and/or secondary amine compounds in the amine hardener. A preferred upper amount is up to 0.25 moles and a more preferred upper amount is up to 0.20 moles of triethylene diamine, in each case per mole of primary and/or secondary amine compounds in the amine hardener. An especially preferred amount is 0.09 to 0.175 moles of triethylene diamine per mole of primary and/or secondary amine compounds in the amine hardener.

Any of the foregoing catalysts can be used in conjunction with one or more other catalysts. If such an added catalyst is used, suitable such catalysts include those described in, for example, U.S. Pat. Nos. 3,306,872, 3,341,580, 3,379,684, 3,477,990, 3,547,881, 3,637,590, 3,843,605, 3,948,855, 3,956,237, 4,048,141, 4,093,650, 4,131,633, 4,132,706, 4,171,420, 4,177,216, 4,302,574, 4,320,222, 4,358,578, 4,366,295, and 4,389,520, and WO 2008/140906, all incorporated herein by reference. Examples of suitable catalysts are imidazoles such as 2-methylimidazole; 2-ethyl-4-methylimidazole; 2-phenyl imidazole; tertiary amines such as triethylamine, tripropylamine, N,N-dimethyl-1-phenylmethaneamine and 2,4,6-tris((dimethylamino)methyl)phenol and tributylamine; phosphonium salts such as ethyltriphenylphosphonium chloride, ethyltriphenylphosphonium bromide and ethyltriphenyl-phosphonium acetate; ammonium salts such as benzyltrimethylammonium chloride and benzyltrimethylammonium hydroxide; various carboxylic acid compounds, and mixtures any two or more thereof.

In some specific embodiments, the triethylene diamine is the sole catalyst provided to the reaction mixture, it being understood that components of the amine hardener are not for purposes of this invention considered as catalysts.

In some embodiments, the reaction mixture contains water and/or a compound having at least one hydroxyl group and an equivalent weight per hydroxyl group of up to 75, preferably up to 50. This compound, if present, is suitably present in small amounts, such as from 0.1 to 10 parts by weight, preferably from 0.25 to 5 parts and still more preferably from 1 to 3 parts by weight per part by weight of triethylene diamine. Besides water, suitable such compounds include, for example, alkanols such as methanol, ethanol, 1-propanol, 2-propanol, 1-butanol, 2-butanol, 1-pentanol, neopentanol, 1-hexanol and the like; alkylene glycols such as ethylene glycol, 1,2-propane diol, 1,3-propane diol, 1,4-butane diol, and neopentyl glycol; poly(alkylene glycols) such as diethylene glycol, triethylene glycol, dipropylene glycol, tripropylene glycol and the like; glycol monoethers such as ethylene glycol monomethyl ether, diethylene glycol monomethyl ether, 1,2-propane diol monomethyl ether, dipropylene glycol monomethyl ether, as well as the corresponding ethyl ethers; glycol monoesters such as ethylene glycol monacetate, diethylene glycol monoacetate, 1,2-propane diol monoacetate, dipropylene glycol monoacetate; higher functionality polyols such as glycerin, oligomers of glycerin, trimethylolpropane, trimethylolethane, pentaerythritol, erythritol, sorbitol, sucrose and the like; and mono- di- or trialkanolamines such as monoethanolamine, diethanolamine, triethanolamine, monoisopropanolamine, diisopropanolamine, triisopropanolamine, aminoethylethanolamine and the like.

The curable reaction mixture may contain other optional components such as impact modifiers, internal mold release agents, pigments, antioxidants, preservatives, impact modifiers as described before, short (up to about 6 inches (15.24 cm) in length, preferably up to 2 inches (5.08 cm) in length, more preferably up to about ½ inch (1.27 cm) in length) reinforcing fibers, non-fibrous particulate fillers including micron- and nanoparticles, wetting agents, internal mold release agents and the like. An electroconductive filler may be present in the hardener mixture.

Suitable impact modifiers include natural or synthetic polymers having a $T_g$ of lower than −40° C. These include natural rubber, styrene-butadiene rubbers, polybutadiene rubbers, isoprene rubbers, polyethers such as poly(propylene oxide), poly(tetrahydrofuran) and butylene oxide-ethylene oxide block copolymers, core-shell rubbers, mixtures of any two or more of the foregoing, and the like. The rubbers are preferably present in the form of small particles that become dispersed in the polymer phase of the composite. The rubber particles can be dispersed within the epoxy resin or hardener and preheated together with the epoxy resin or hardener prior to forming the hot reaction mixture.

It is generally preferred to cure the epoxy resin and the hardener in the presence of an internal mold release agent. Such an internal mold release agent may constitute up to 5%, more preferably up to about 1% of the total weight of the reaction mixture. Suitable internal mold release agents are well known and commercially available, including those marketed as Marbalease™ by Rexco-USA, Mold-Wiz™ by Axel Plastics Research Laboratories, Inc., Chemlease™ by Chem-Trend, PAT™ by Würtz GmbH, Waterworks Aerospace Release by Zyvax and Kantstik™ by Specialty Products Co. In addition to (or instead of) adding the internal mold release agent at the mixhead, it is also possible to combine such an internal mold release agent into the resin component and/or the hardener before the resin component and the hardener are brought together.

Suitable particulate fillers have an aspect ratio of less than 5, preferably less than 2, and do not melt or thermally degrade under the conditions of the curing reaction. Suitable fillers include, for example, glass flakes, aramid particles, carbon black, carbon nanotubes, various clays such as montmorillonite, and other mineral fillers such as wollastonite, talc, mica, titanium dioxide, barium sulfate, calcium carbonate, calcium silicate, flint powder, carborundum, molybdenum silicate, sand, and the like. Some fillers are somewhat electroconductive, and their presence in the composite can increase the electroconductivity of the composite. In some applications, notably automotive applications, it is preferred that the composite is sufficiently electroconductive that coatings can be applied to the composite using so-called "e-coat" methods, in which an electrical charge is applied to the composite and the coating becomes electrostatically attracted to the composite. Conductive fillers of this type include metal particles (such as aluminum and copper), carbon black, carbon nanotubes, graphite and the like.

In some embodiments, the curable epoxy resin system has, when cured at at least one temperature between 100 and 120° C., a gel time of at least 10 seconds, at least 30 seconds, at least 45 seconds or preferably at least 60 seconds, and a time to vitrification of no greater than 350 seconds, preferably no greater than 300 seconds and still more preferably no greater than 240 seconds. In some embodiments, the time to vitrification is no greater than 180 seconds or no greater than 120 seconds at this temperature. Gel time and time to vitrification are for purposes of this invention measured by chemorheological methods using an Anton PaarMCR 301 rheometer or equivalent device, in which the instrument is preheated to the cure temperature prior to each measurement. The intersection of the G' and G" plots represents the gel time, and the peak of the G" curve represents the time to vitrification.

Thermosets are formed from the epoxy resin system of the invention by mixing the epoxy resin component and hardener at proportions as described before and curing the resulting mixture. Either or both of the components can be preheated if desired before they are mixed with each other. It is generally necessary to heat the mixture to an elevated temperature to obtain a rapid cure. In a molding process such as the process for making molded composites described below, the curable reaction mixture is introduced into a mold, which may be, together with any reinforcing fibers and/or inserts as may be contained in the mold, preheated. The curing temperature may be, for example, from 60 to 180° C. When a long (at least 30 seconds, preferably at least 40 seconds) gel time is desirable, the curing temperature preferably is not greater than 130° C. When both a long gel time and a short demold time is wanted, a suitable curing temperature is 80 to 120° C., preferably 95 to 120° C. and especially 105 to 120° C.

It is preferred to continue the cure until the resulting polymer attains a glass transition temperature in excess of the cure temperature. The glass transition temperature at the time of demolding is preferably at least 100° C., more preferably at least 110° C., still more preferably at least 115° C. and even more preferably at least 120° C. An advantage of this invention is that such glass transition temperatures can be obtained with short curing times. This allows for short cycle times. Demold times at cure temperatures of 95 to 120° C., especially 105 to 120° C., are typically 350 seconds or less, preferably are 300 seconds or less and more preferably 240 seconds or less. In some embodiments, the demold time at such temperatures is no more than 180 seconds or no more than 120 seconds.

The curable epoxy resin system of the invention is particularly useful for making fiber-reinforced composites by curing the system in the presence of reinforcing fibers. These composites are in general made by mixing the epoxy resin component with the hardener to form a mixture, wetting the fibers with the mixture, and then curing the mixture in the presence of the catalyst and the reinforcing fibers.

The reinforcing fibers are thermally stable and have a high melting temperature, such that the reinforcing fibers do not degrade or melt during the curing process. Suitable fiber materials include, for example, glass, quartz, polyamide resins, boron, carbon, wheat straw, hemp, sisal, cotton, bamboo and gel-spun polyethylene fibers.

The reinforcing fibers can be provided in the form of short (0.5 to 15 cm) fibers, long (greater than 15 cm) fibers or continuous rovings. The fibers can be provided in the form of a mat or other preform if desired; such mats or performs may in some embodiments be formed by entangling, weaving and/or stitching the fibers, or by binding the fibers together using an adhesive binder. Preforms may approximate the size and shape of the finished composite article (or portion thereof that requires reinforcement). Mats of continuous or shorter fibers can be stacked and pressed together, typically with the aid of a tackifier, to form preforms of various thicknesses, if required.

Suitable tackifiers for preparing performs (from either continuous or shorter fibers) include heat-softenable polymers such as described, for example, in U.S. Pat. Nos. 4,992,228, 5,080,851 and 5,698,318. The tackifier should be compatible with and/or react with the polymer phase of the composite, so that there is good adhesion between the polymer and reinforcing fibers. A heat-softenable epoxy resin or mixture thereof with a hardener, as described in U.S. Pat. No. 5,698,318, is especially suitable. The tackifier may contain other components, such as one or more catalysts, a thermoplastic polymer, a rubber, or other modifiers.

A sizing or other useful coating may be applied onto the surface of the fibers before they are introduced into the mold. A sizing often promotes adhesion between the cured epoxy resin and the fiber surfaces.

The composite may be formed in a mold. In such a case, the reinforcing fibers may be introduced into the mold before the epoxy resin/hardener mixture. This is normally the case when a fiber preform is used. The fiber preform is placed into the mold, the mold is closed, and the epoxy resin/hardener mixture is then introduced into the mold, where it penetrates between the fibers in the preform, fills the cavity, and then cures to form a composite product.

Alternatively, the fibers (including a preform) can be deposited into an open mold, and the reaction mixture can be sprayed, poured or injected onto the preform and into the mold. After the mold is filled in this manner, the mold is closed and the reaction mixture cured. An example of a process of this type is gap compression resin transfer molding, in which the mold containing the fibers is kept open with a gap which may be, for examples 10 to 100% or more of the original cavity thickness. The gap permits lower flow resistance, which makes mold filling easier and facilitates penetration of the reaction mixture around and between the fibers.

Short fibers can be introduced into the mold with the reaction mixture. Such short fibers may be, for example, blended with the epoxy resin or hardener (or both) prior to forming the reaction mixture. Alternatively, the short fibers may be added into the reaction mixture at the same time as the epoxy and hardener are mixed, or afterward but prior to introducing the hot reaction mixture into the mold.

Alternatively, short fibers can be sprayed into a mold. In such cases, the reaction mixture can also be sprayed into the mold, at the same time or after the short fibers are sprayed in. When the fibers and reaction mixture are sprayed simultaneously, they can be mixed together prior to spraying. Alternatively, the fibers and reaction mixture can be sprayed into the mold separately but simultaneously. The sprayed materials may be spread and/or leveled using a doctor blade or similar device before closing the mold and performing the cure. In a process of particular interest, long fibers are chopped into short lengths and the chopped fibers are sprayed into the mold, at the same time as or immediately before the hot reaction mixture is sprayed in. Mesh materials often function as flow promoters.

A wet compression process can be used, in which the reaction mixture is applied directly to a fiber preform or stack without injection by spraying (as in the PUpreg or Baypreg processes), or by laying it down as "bands" of system, which are being fed through a wider slit die, which could have a width of 1 cm to 50 cm or more. Sufficient material is applied to reach the desired fiber volume content in the final product. The reaction mixture can be applied to the fibers inside an open mold, or outside the mold. The reaction mixture may instead be applied to the center layer of a build up, by wetting a layer of fibers with the reaction mixture and then putting a second layer of fibers onto the wetted surface, therefore sandwiching the resin layer in between two layers of fibers. The fiber mats can be made out of non crimped fiber buildups, of woven fabric, of random fiber build-ups or preforms. If the reaction mixture is applied to the fibers outside of the mold, it is typically applied at a somewhat low temperature, to prevent premature curing, and to reduce the viscosity of the reaction mixture so it does not drip off the fibers before they are transferred into the mold. The wetted preform is then placed into the lower half of a hot mold, the mold is closed and the material cured under compression.

Composites made in accordance with the invention may have fiber contents of at least 10 volume percent, preferably at least 25 volume percent or at least 35 volume percent, up to 80 volume percent, preferably up to 70 volume percent, more preferably up to 60 volume percent.

The mold may contain, in addition to the reinforcing fibers, one or more inserts. Such inserts may function as reinforcements, may function as flow promoters, and in some cases may be present for weight reduction purposes. Examples of such inserts include, for example, wood, plywood, metals, various polymeric materials, which may be foamed or unfoamed, such as polyethylene, polypropylene, another polyolefin, a polyurethane, polystyrene, a polyamide, a polyimide, a polyester, polyvinylchloride and the like, various types of composite materials, and the like, that do not become distorted or degraded at the temperatures encountered during the molding step.

The reinforcing fibers and core material, if any, may be enclosed in a bag or film such as is commonly used in vacuum assisted processes.

The mold and the preform (and any other inserts, if any) may be heated to the curing temperature or some other useful elevated temperature prior to contacting them with the reaction mixture. The mold surface may be treated with an external mold release agent, which may be solvent or water-based.

The particular equipment that is used to mix the components of the reaction mixture and transfer the mixture to the mold is not considered to be critical to the invention, provided the reaction mixture can be transferred to the mold before it attains a high viscosity or develops significant amounts of gels. The process of the invention is amenable to RTM, VARTM, RFI, gap compression resin transfer molding and SCRIMP processing methods and equipment (in some cases with equipment modification to provide the requisite heating at the various stages of the process), as well as to other methods such as wet compression.

The mixing apparatus can be of any type that can produce a highly homogeneous mixture of the epoxy resin and hardener (and any optional components that are also mixed in at this time). Mechanical mixers and stirrers of various types may be used. Two preferred types of mixers are static mixers and impingement mixers.

In some embodiments, the mixing and dispensing apparatus is an impingement mixer. Mixers of this type are commonly used in so-called reaction injection molding processes to form polyurethane and polyurea moldings. The epoxy resin and hardener (and other components which are mixed in at this time) are pumped under pressure into a mixing head where they are rapidly mixed together. Operating pressures in high pressure machines may range from 1,000 to 29,000 psi or higher (6.9 to 200 MPa or higher), although some low pressure machines can operate at significantly lower pressures. The resulting mixture is then preferably passed through a static mixing device to provide further additional mixing, and then transferred into the mold cavity. The static mixing device may be designed into the mold. This has the advantage of allowing the static mixing device to be opened easily for cleaning.

In certain specific embodiments, the epoxy resin and hardener are mixed as just described, by pumping them under pressure into a mixing head. Impingement mixing may be used. The catalyst is introduced with the epoxy resin, the hardener, or as a separate stream. The operating pressure of the incoming epoxy resin and hardener streams may range from a somewhat low value (for example, from about 1 to about 6.9 MPa) or a high value (such as, for example, from 6.9 to 200 MPa). The resulting mixture of epoxy resin, hardener and catalyst is then introduced into the mold at a somewhat low operating pressure, such as up to 5 MPa or up to about 1.035 MPa). In such embodiments, the mixture of epoxy resin, hardener and catalyst is typically passed through a static mixer before entering the mold. Some or all of the pressure drop between the mixhead and the mold injection port often will take place through such a static mixer. An especially preferred apparatus for conducting the process is a reaction injection molding machine, such as is commonly used to processes large polyurethane and polyurea moldings. Such machines are available commercially from Krauss Maffei Corporation and Cannon or Hennecke.

In other embodiments, the reaction mixture is mixed as before, and then sprayed into the mold. Temperatures are maintained in the spray zone such that the temperature of the hot reaction mixture is maintained as described before.

The mold is typically a metal mold, but it may be ceramic or a polymer composite provided the mold is capable of withstanding the pressure and temperature conditions of the molding process. The mold contains one or more inlets, in liquid communication with the mixer(s), through which the reaction mixture is introduced. The mold may contain vents to allow gases to escape as the reaction mixture is injected.

The mold is typically held in a press or other apparatus which allows it to be opened and closed, and which can apply pressure on the mold to keep it closed during the filling and curing operations. The mold or press is provided with means by which heat or cooling can be provided.

In some embodiments of the foregoing process, the molded composite is demolded in no more than 5 minutes, preferably from 2 to 5 minutes, more preferably from 2 to 4 minutes, after the epoxy resin system has been introduced into the mold. In such processes, the introduced reaction mixture flows around and between the reinforcing fibers and fills the mold and then cures in the mold, preferably forming a polymer having a glass transition temperature of at least 110° C. (more preferably at least 115° C. or at least 120° C.) within five minutes, more preferably within four minutes, after the reaction mixture has been introduced into the mold.

The process of the invention is useful to make a wide variety of composite products, including various types of automotive parts. Examples of these automotive parts include vertical and horizontal body panels, automobile and truck chassis components, and so-called "body-in-white" structural components.

Body panel applications include fenders, door skins, hoods, roof skins, decklids, tailgates and the like. Body panels often require a so-called "class A" automotive surface which has a high distinctness of image (DOI). For this reason, the filler in many body panel applications will include a material such as mica or wollastonite.

The following examples are provided to illustrate the invention, but not limit the scope thereof. All parts and percentages are by weight unless otherwise indicated.

EXAMPLES 1-14 AND COMPARATIVE SAMPLES A-B

The curing characteristics of curable epoxy resin systems Examples 1-14 and Comparative Samples A and B are evaluated as follows. Epoxy Resin A (a diglycidyl ether of bisphenol A, having an epoxy equivalent weight of about 180 and a molecular weight of about 350) is mixed with a commercially available triethylene tetraamine amine hardener (D.E.H. 24 from The Dow Chemical Company) and triethylene diamine for 30 seconds on a high speed laboratory mixture. The triethylene tetraaamine hardener contains about 99% by weight triethylene tetaamines of which about 68% by weight is linear triethylene tetraamine ($H_2N-CH_2-CH_2-NH-CH_2-CH_2-NH-CH_2-CH_2-NH_2$).

In some cases, water or a hydroxyl compound are added as well, as indicated in Table 1. Ratios of starting materials are as indicated in Table 1.

A sample of the mixture is in each case (except for Examples 13 and 14) poured into a preheated MCR 301 rheometer (Anton Paar) (25 mm parallel plates) equipped with a Peltier heating system. The measuring temperature is as indicated in Table 1. The shear storage and shear loss moduli (G' and G") are continuously measured. The time at which the plots of G' and G" intersect (i.e., when G' becomes equal to G") is taken as the gel time. The time at which G" exhibits its peak value is taken as the vitrification point. The vitrification point corresponds well to a demold time. Results are as indicated in Table 1 below.

For Examples 13 and 14, a sample of the mixture is poured onto a preheated hot plate. The measuring temperature is as indicated in Table 1. Time is measured from the point at which the mixture contacts the hot plate surface. A line is scored through the liquid disk periodically, using a pallet knife or similar blade. The gel time is the time after which the liquid material would no longer flow into the scored line. Demold time is the time after pouring at which the disk can be removed from the hot plate surface as a solid with a pallet knife.

Another portion of each of the epoxy resin systems is evaluated for glass transition temperature by dynamic scanning calorimetry as follows: the sample is heated from 25 to 250° C. at 20° C./minute, held at 250° C. for three minutes and cooled to 25° C. at 20° C./minute. The sample is maintained at 25° C. for three minutes and then heated again to 250° C. at 25° C./minute. Glass transition temperature is measured on the second heating segment, and taken as the temperature at the onset of the transition. Results are as indicated in Table 1.

TABLE 1

| | Example or Comparative Sample No. | | | | | | | | | | | | | | | |
|---|---|---|---|---|---|---|---|---|---|---|---|---|---|---|---|---|
| | A* | B | 1 | 2 | 3 | 4 | 5 | 6 | 7 | 8 | 9 | 10 | 11 | 12 | 13 | 14 |
| Ingredient | | | | | | | | | | | | | | | | |
| Epoxy Resin, eq. | 1 | 1.1 | 1.1 | 1.1 | 1.1 | 1.1 | 1.1 | 1.1 | 1.1 | 1.1 | 1.1 | 1.1 | 1.1 | 1.1 | 1.1 | 1.1 |
| TETA, eq. | 0 | 1 | 1 | 1 | 1 | 1 | 1 | 1 | 1 | 1 | 1 | 1 | 1 | 1 | 1 | 1 |
| DETA, eq | 1.1 | 0 | 0 | 0 | 0 | 0 | 0 | 0 | 0 | 0 | 0 | 0 | 0 | 0 | 0 | 0 |
| Isophorone Diamine, eq. | 0 | 0 | 0 | 0 | 0 | 0 | 0 | 0 | 0 | 0 | 0 | 0 | 0 | 0 | 0 | 0 |
| Bisphenol A, eq. | 0.3 | 0 | 0 | 0 | 0 | 0 | 0 | 0 | 0 | 0 | 0 | 0 | 0 | 0 | 0 | 0 |
| DABCO, moles/mole TETA | 0 | 0 | 0.1 | 0.1 | 0.1 | 0.1 | 0.1 | 0.15 | 0.15 | 0.15 | 0.05 | 0.20 | 0.1 | 0.1 | 0.1 | 0.1 |
| Water, g/g DABCO | 0 | 0 | 0 | 0 | 0 | 0 | 0 | 0 | 0 | 0 | 0 | 0 | 0 | 0.38 | 0 | 0 |
| EG, g/g DABCO | 0 | 0 | 0 | 0 | 0 | 0 | 0 | 0 | 0 | 0 | 0 | 0 | 2 | 2 | 0 | 0 |
| DEOA, g/g DABCO | 0 | 0 | 0 | 0 | 0 | 0 | 0 | 0 | 0 | 0 | 0 | 0 | 0 | 0 | 2 | 0 |
| AEEA, g/g DABCO | 0 | 0 | 0 | 0 | 0 | 0 | 0 | 0 | 0 | 0 | 0 | 0 | 0 | 0 | 0 | 1 |
| Bisphenol A Mannich base, moles/mole TETA | 0.1 | 0 | 0 | 0 | 0 | 0 | 0 | 0 | 0 | 0 | 0 | 0 | 0 | 0 | 0 | 0 |
| Test Results | | | | | | | | | | | | | | | | |
| Temperature, ° C. | 95 | 110 | 100 | 105 | 110 | 115 | 120 | 110 | 115 | 120 | 110 | 110 | 110 | 110 | 100 | 100 |
| Gel time, s | 109 | 159 | 184 | 160 | 137 | 103 | 88 | 120 | 87 | 66 | 148 | 106 | 92 | 86 | 75 | 75 |

TABLE 1-continued

| | Example or Comparative Sample No. | | | | | | | | | | | | | | | |
|---|---|---|---|---|---|---|---|---|---|---|---|---|---|---|---|---|
| | A* | B | 1 | 2 | 3 | 4 | 5 | 6 | 7 | 8 | 9 | 10 | 11 | 12 | 13 | 14 |
| Vitrification time, s | 199 | 965 | 366 | 343 | 296 | 257 | 240 | 238 | 202 | 177 | 397 | 200 | 262 | 237 | 150 | 150 |
| $T_g$ (onset), ° C. | 104 | 101 | 134 | 134 | 134 | 134 | 134 | 127 | 127 | 127 | 127 | 113 | 118 | 118 | ND | ND |

*Not an example of this invention.
The epoxy resin is a diglycidyl ether of bisphenol A.
TETA is a commercial triethylene tetraamine hardener sold as D.E.H. 24 by The Dow Chemical Company.
DETA is a commercial diethylene triamine hardener sold as D.E.H. 20 by The Dow Chemical Company
DABCO is triethylene diamine.
EG is ethylene glycol.
DEOA is diethanolamine.
AEEA is aminoethylethanolamine.

As can be seen from the data in Table 1, Comparative Sample A provides a long open time followed by a fast cure, at a low (95° C.) curing temperature. Unfortunately, the glass transition temperature is only 104° C.

With this invention, glass transition temperatures (onset) ranging from 113° C. to 134° C. are obtained using various loadings of the triethylene diamine (DABCO) catalyst, and at various curing temperatures from 100 to 120° C. The highest glass transition temperatures are seen at catalyst loadings of 0.10 to 0.15 mole %, based on TETA (Examples 1-8 and 11-14).

Gel time and vitrification time are affected by the catalyst loading and curing temperature. The effects of catalyst loading are seen by comparing, for instance, Examples 3, 6, 9 and 10. Higher catalyst loadings reduce both vitrification times very significantly and have a smaller effect on gel times. The data for Examples 1-9 suggests that about 0.09 to 0.175 moles of triethylene diamine per part per mole of per mole of primary and/or secondary amine compounds provides an excellent balance of gel and vitrification times, while producing a cured resin having a high glass transition temperature.

Increasing the curing temperature decreases both gel and vitrification times, as can be seen by comparing Examples 1-5 and Examples 6-8. Vitrification times for many of the examples are 240 seconds or less, which is consistent with a commercial target of a four minute demold time for composite manufacture.

Examples 11-14 show the effect of adding a small amount of a compound containing aliphatic hydroxyl groups. The presence of the hydroxyl compound significantly reduces vitrification times. Gel times are reduced as well.

EXAMPLES 15-18 AND COMPARATIVE SAMPLE C

The curing characteristics of curable epoxy resin systems Examples 15-17 and Comparative Sample C are evaluated on a KraussMaffei Rim Star® 4/4 high-pressure injection machine. The machine is equipped with heated raw material tanks and high-pressure capable lines leading to high-pressure hydraulic mixing head. Target mix head pressures are 10 MPa for both resin and hardener. Raw material temperatures are as indicated in Table 2. The epoxy resin is a diglycidyl ether of bisphenol A. The hardener for Examples 15-18 is in each case a blend of a triethylene tetraamine mixture sold as D.E.H. 24 by The Dow Chemical Company and triethylene diamine at a mole ratio of 1:0.1. The hardener for Comparative Sample C is as described in WO 2012/177392. The stainless steel mold has internal dimensions of length 540 mm, width 290 mm and depth 2.3 mm, and contains a Panex UD300 (from Zoltek) carbon fiber preform having a weight of 330 g/qm. The mold includes a central injection point with two venting points. A closed mold injection procedure is applied. The mold temperatures are as indicated in Table 2. Injection rates, shot times, shot weights, resin:hardener weight ratios, demold times and the glass transition temperature of the cured resin phase of the resulting composite are all as indicated in Table 2.

TABLE 2

| Experiment Type | Comp. Sample C | Ex. 15 | Ex. 16 | Ex. 17 | Ex. 18 |
|---|---|---|---|---|---|
| Total Shotweight [g] | 265 | 300 | 300 | 300 | 300 |
| Shot Time [s] | 10 | 10 | 10 | 10 | 10 |
| Ratio Resin:Hardener Wt. Ratio | 100:26 | 100:13.4 | 100:14.7 | 100:16.2 | 100:16.2 |
| Epoxy:amine hydrogen equivalent ratio | 0.9:1 | 1.1:1 | 1:1 | 1:1.1 | 1:1.1 |
| Injection Rate [g/s] | 26.5 | 30 | 30 | 30 | 30 |
| Resin Temp ° C. | 80 | 80 | 80 | 80 | 80 |
| Hardener Temp ° C. | 30 | 50 | 50 | 50 | 50 |
| Demold Time [s] | 180 | 300 | 180 | 120 | 60 |
| Upper mold Temp., [C. °] | 95 | 115 | 115 | 115 | 115 |
| Lower mold Temperature, [C. °] | 91 | 115 | 115 | 115 | 115 |
| Glass Transition Temperature, ° C. | 116 | 143 | 150 | 139 | 139 |

*Not an example of this invention.
Glass transition temperature (Max tan Δ) is measured by DMA (3-point bending).
An internal mold release agent is also present in Examples 18.

Examples 15-18 show the effect of the epoxy:amine ratio on curing times and glass transition temperature. At a 1.1:1 equivalent ratio (Ex. 15), demold time is five minutes, and a material having a glass transition temperature of 143° C. (higher than the Comparative) is obtained. Shorter demold times and higher glass transition temperatures are obtained with this invention when a small excess of the amine hardener is used. Examples 17 and 18 in particular provide very short demold times at the mold temperatures used, and can be molded at lower temperatures, comparable to that used in Comparative Sample C, to obtain a longer gel time if necessary while maintaining a high glass transition temperature.

The invention claimed is:

1. A curable epoxy resin system, comprising
   1) an epoxy resin component containing one or more epoxy resins, wherein at least 80% by weight of the epoxy resins is one or more polyglycidyl ethers of a polyphenol that has an epoxy equivalent weight of up to about 250;
   2) an amine hardener, wherein the amine hardener is a polyethylene tetraamine mixture containing at least 95% by weight polyethylene tetraamines, the mixture containing at least 40% by weight linear triethylene tetraamine, wherein at least 0.8 epoxy equivalents are provided to the reaction mixture by the epoxy resin component per amine hydrogen equivalent provided by the amine hardener; and
   3) 0.01 to 0.5 moles of triethylene diamine per mole of primary and/or secondary amine compounds in the amine hardener, the triethylene diamine being present in the epoxy resin component, the amine hardener, or both.

2. The curable epoxy resin system of claim 1, which contains 0.05 to 0.175 moles of triethylene diamine per mole of primary and/or secondary amine compounds in the amine hardener.

3. The curable epoxy resin system of claim 1, which further comprises 0.1 to 10 parts by weight, per part by weight triethylene diamine, of a hydroxyl compound selected from the group consisting of water and compounds having at least one hydroxyl group and an equivalent weight per hydroxyl group of up to 75.

4. The curable epoxy resin system of claim 3, wherein the hydroxyl compound is one or more of water, an alkanol, an alkylene glycol, a glycol monoether, a glycol monoester, trimethylolpropane, glycerin, an oligomer of glycerin, trimethylolethane, pentaerythritol, erythritol, sorbitol, sucrose or a mono-, di- or trialkanolamine.

5. A process for forming a fiber-reinforced epoxy composite having a cured epoxy resin phase having reinforcing fibers dispersed therein, comprising;
   a) mixing an epoxy resin component with an amine hardener by impingement mixing and transferring the resulting reactive mixture into a mold that contains reinforcing fibers, and
   b) curing the reactive mixture in the mold at an elevated temperature to form a fiber-reinforced composite in which the reinforcing fibers are embedded in a polymeric matrix formed by curing the reactive mixture, and
   c) demolding the fiber-reinforced composite, wherein;
   1) the epoxy resin component contains one or more epoxy resins, wherein at least 80% by weight of the epoxy resin is one or more polyglycidyl ethers of a polyphenol that has an epoxy equivalent weight of up to about 250;
   2) the amine hardener is a polyethylene tetraamine mixture containing at least 95% by weight polyethylene tetraamines, the mixture containing at least 40% by weight linear triethylene tetraamine,
   3) in step a) the epoxy resin component and the amine hardener are mixed in proportions which, prior to reaction, provide 0.8 to 1.25 epoxy equivalents per amine hydrogen equivalent of primary and/or secondary amine compounds; and
   4) 0.01 to 0.5 moles of triethylene diamine are provided in the reactive mixture per mole of primary and/or secondary amine compounds provided in the amine hardener.

6. The process of claim 5, wherein 0.05 to 0.175 moles of triethylene diamine are provided to the reactive mixture per mole of primary and/or secondary amine compounds in the amine hardener.

7. The process of claim 5, wherein 0.1 to 10 parts by weight, per part by weight triethylene diamine, of a hydroxyl compound selected from the group consisting of water and compounds having at least one hydroxyl group and an equivalent weight per hydroxyl group of up to 75, are provided to the reactive mixture.

8. The process of claim 7, wherein the hydroxyl compound is one or more of water, an alkanol, an alkylene glycol, a glycol monoether, a glycol monoester, trimethylolpropane, trimethylolethane, pentaerythritol, erythritol, sorbitol, sucrose or a mono-, di- or trialkanolamine.

9. The process of claim 5, wherein the reactive mixture system exhibits a gel time of at least 60 seconds and a time to vitrification of no greater than 350 seconds on a preheated rheomoeter at at least one cure temperature 100 and 120° C.

10. The process of claim 5, wherein the reactive mixture exhibits a gel time of at least 10 seconds and a time to vitrification of no greater than 120 seconds on a preheated rheomoeter at at least one cure temperature 100 and 120° C.

11. The process of claim 5, wherein the elevated temperature is from 80 to 140° C.

12. The process of claim 5, wherein the demold time is 120 seconds or less.

13. The process of claim 5, wherein the cured epoxy resin phase has a glass transition temperature of at least 110° C. at the time of demold.

14. The process of claim 5, which is a resin transfer molding process, a wet compression molding process or a gap injection molding process.

15. The process of claim 5, wherein the epoxy resin component and the amine hardener are mixed in proportions which, prior to reaction, provide 0.8 to 1.25 epoxy equivalents per equivalent of amine hydrogens.

16. The process of claim 5, wherein the polyethylene tetramine mixture contains no more than 0.3% by weight aminoethylethanolamine.

17. The process of claim 5, wherein the reactive mixture contains an internal mold release agent.

18. A cured fiber-reinforced composite made by the process of claim 5.

* * * * *